US008047515B2

(12) United States Patent
Asayama

(10) Patent No.: US 8,047,515 B2
(45) Date of Patent: Nov. 1, 2011

(54) JIG AND METHOD FOR PROCESSING CYLINDER BLOCK

(75) Inventor: Kazuhiro Asayama, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 255 days.

(21) Appl. No.: 12/447,676

(22) PCT Filed: Mar. 5, 2008

(86) PCT No.: PCT/JP2008/054432

§ 371 (c)(1), (2), (4) Date: Apr. 29, 2009

(87) PCT Pub. No.: WO2008/117662

PCT Pub. Date: Oct. 2, 2008

(65) Prior Publication Data

US 2010/0066000 A1 Mar. 18, 2010

(30) Foreign Application Priority Data

Mar. 27, 2007 (JP) ................................ 2007-082582

(51) Int. Cl.
*B23Q 3/18* (2006.01)
*B23P 25/00* (2006.01)
*B24B 33/00* (2006.01)

(52) U.S. Cl. ..................................... 269/101; 29/888.06

(58) Field of Classification Search .................. 269/101, 269/40; 29/888.01, 888.06, 888.061; 408/79, 408/80, 81, 82
See application file for complete search history.

(56) References Cited

U.S. PATENT DOCUMENTS

| | | | | |
|---|---|---|---|---|
| 2,986,050 | A * | 5/1961 | Wolf | 408/79 |
| 5,062,746 | A * | 11/1991 | Deremo | 408/79 |
| 6,609,706 | B2 * | 8/2003 | Shibata | 269/91 |

FOREIGN PATENT DOCUMENTS

| | | | |
|---|---|---|---|
| JP | 62287965 | A * | 12/1987 |
| JP | 11267960 | A * | 10/1999 |
| JP | 2002-120107 | | 4/2002 |
| JP | 2002-307291 | | 10/2002 |
| JP | 2004-243514 | | 9/2004 |
| JP | 2005-199378 | | 7/2005 |

* cited by examiner

*Primary Examiner* — David B Thomas
(74) *Attorney, Agent, or Firm* — Finnegan, Henderson, Farabow, Garrett & Dunner, LLP

(57) ABSTRACT

A jig for used in performing a finish processing of a cylinder bore 3 comprises a jig body 10 that comes close to and disengages from a cylinder head mounting surface 2, bolt member 16 that forms a tapered bore portion 20 by a internal surface 21 of a plurality of blot pieces 18 having a threaded portion 19 engageable to a female threaded portion 8 of a head bolt hole 7 and that expands the diameter thereof by a wedge action receiving through the tapered bore portion 20, a tapered shaft member 17 having a tapered surface portion 22 inserted into the tapered bore portion 20 so as to add the wedge action to it, and a piston member 24 having a pressing surface 23 contacting a given surface portion on the cylinder head mounting surface 2.

5 Claims, 3 Drawing Sheets

JIG AND METHOD FOR PROCESSING CYLINDER BLOCK

CROSS-REFERENCE TO RELATED APPLICATIONS

This application is a national phase application of International Application No. PCT/JP2008/054432, filed Mar. 5, 2008, and claims the priority of Japanese Application No. 2007-082582, filed Mar. 27, 2007, the contents of both of which are incorporated herein by reference.

BACKGROUND OF THE INVENTION

1. Field of the Invention

The present invention relates to a jig and a method for processing a cylinder block for used in finish processing for a cylinder bore in the cylinder block.

2. Related Art

For example, in a cylinder block making up of an engine installed on an automobile or the like, aperture portions requiring a predetermined roundness are formed. As these aperture portions, for example, a cylinder bore, which slidably incorporates a piston connected to a crankshaft of the engine via a con rod or the like, and a bearing hole, which supports a journal portion of the crankshaft and so on. In other words, a finish processing (a perfect circle processing) such as honing process is performed, for the aperture portions such as the cylinder bore and the bearing hole, so as to acquire the predetermined roundness.

Meanwhile, the roundness of the aperture portion such as the cylinder bore is affected by bolt fastening accompanying the assembly of components on the process of assembling the engine or the like. In other words, the cylinder block or the like is distorted (deformed) due to a tightening force of the bolt fastening (a fastening axial force), and the roundness of the aperture portion such as the cylinder bore is deteriorated, by assembling the components into the cylinder block by the bolt fastening.

Consequently, conventionally, the finish processing is performed in the state that the distortion (the deformation) caused by assembling the components into the cylinder block or the like is reproduced (simulated) for the aperture portion such as the cylinder bore (see, for example, JP 2004-243514 and JP 2002-120107).

JP 2004-243514 shows a dummy head processing, as a representative example of method for performing the finish processing in the state that the distortion accompanying the assembly of the components into the cylinder block is preliminary added to the aperture portion such as the cylinder bore. In the dummy head processing, so-called a dummy head is used. The dummy head is a jig for processing different from the cylinder head incorporated as an actual product, and is assembled into the cylinder block using the fastening means such as the bolt (the head bolt) as with the cylinder head. In other words, the distortion caused by assembling the cylinder head into the cylinder block is added to the aperture portion such as the cylinder bore, by assembling the dummy head into the cylinder block. In the circumstances, the finish processing is performed in the aperture portion such as the cylinder bore. Accordingly, the effect of the actual assembly of the cylinder head on the roundness of the aperture portion such as the cylinder bore (the deterioration of the roundness) is reduced.

The above-mentioned dummy head processing includes the following problems. The dummy head processing is based on the concept of performing the finish processing for the aperture portion such as the cylinder bore, in the state that the assembly completed condition as an engine assembly is reproduced, by assembling the dummy head into the cylinder block with the bolt fastening. For this reason, the preparation for a considerable number of dummy heads considering a production cycle time, the equipments for assembling/removing the dummy head or the like are required. Therefore, the preparation for a considerable number of dummy heads and additional spaces as well as the additional equipments and process for assembling/removing the dummy head, for processing the cylinder block with the dummy head processing are required, compared to the processing of the cylinder block in a normal processing without the dummy head processing, thereby increasing the production cost.

Meanwhile, JP 2002-120107 discloses a technology of the roundness processing for the bearing hole (the journal bearing hole) supporting the crankshaft. For example, as shown in the specification, the bearing hole is formed by means of assembling a lower case to the cylinder block by the bolt fastening.

JP 2002-120107 discloses a technology for performing the roundness processing of the bearing hole, in the state that the deformation equivalent to one caused by the bolt fastening or the like is added, by adding a prescribed load using a pressing pin, instead of the bolt fastening, so as to form the bearing hole. The technology is aimed at improving the production efficiency by getting rid of the bolt fastening process and the bolt demolition process, in the roundness processing for the bearing hole.

The technology disclosed in JP 2002-120107 is used in the processing for the bearing hole, but has a possibility of application to the processing for the cylinder bore. In this case, specifically, the deformation is added to the cylinder bore, by adding the predetermined load to the cylinder head mounting surface by the pressing pin, instead of assembling the dummy head into the cylinder block by the bolt fastening. Accordingly, the dummy head is not needed, whereby the problems on the dummy head processing caused by using the dummy head as described above are solved.

However, the deformation of the cylinder bore caused by assembling the cylinder head (the dummy head) into the cylinder block is caused not only by the pressing on the cylinder head mounting surface but also by the action of the fastening axial force by the bolt fastening (the tensile force by the bolt). For this reason, the deformation of the cylinder bore caused by assembling the cylinder head become difficult to be fully reproduced, by using the technology disclosed in JP 2002-120107.

In this respect, it is an object of the present invention to provide a jig and a method for processing the cylinder block, which is capable of using existing equipments for preliminary adding the cylinder bore to the predetermined deformation and which is capable of improving the production efficiency, without increase in the space, the equipment, the process or the like leading to the increase of the production cost, in the finish processing for the cylinder bore in the cylinder block.

SUMMARY OF THE INVENTION

The problem so as to be solved by the present invention is as mentioned above. Next, the means of solving the problem will be described.

A jig for processing the cylinder block according to the present invention, which is the jig for processing the cylinder block for used in finish processing of the cylinder bore in the cylinder block, comprises a jig body, a bolt member, a tapered shaft member and a piston member. In this regard, the jig body has a facing surface facing with a cylinder head mounting surface, and is provided so that the facing surface and the cylinder head mounting surface are relatively closed and separated, with the facing surface facing with the cylinder head mounting surface. The bolt member is saliently provided onto the opposed surface, as a portion having a rod-like outer shape that is capable of being inserted into the bolt hole for mounting the cylinder head opening on the cylinder head mounting surface, and has multiple bolt pieces that is formed on the lateral surface thereof with a threaded portion engageable to a female threaded portion of the bolt hole. The bolt member forms a tapered bore that is tapered on the side of the facing surface and that is opened on the opposite side of the facing surface side by the internal surfaces of the bolt pieces. The bolt member expands the diameter thereof by displacing the bolt pieces due to a wedge action receiving through the tapered bore. The tapered shaft member has a tapered surface portion that is inserted into and projected from the tapered bore and that provides the wedge action by the relative movement between the bolt member thereof A piston member is provided so that it can be biased by a given suppress strength in the direction projecting toward the opposed surface and has a pressing surface contacting a prescribed surface portion of the cylinder head mounting surface.

Accordingly, in the finish processing for the cylinder bore in the cylinder block, existing equipments can be used, so as to preliminarily add the prescribed deformation to the cylinder bore, thereby improving the production efficiency, without the increase in the space, the equipment, the process or the like leading to the increase of the production cost.

In the jig for processing the cylinder block of the present invention, the tapered shaft member has an extended portion on the end side of the insertion direction into the tapered bore portion, and is provided so that it can be biased by the given suppress strength in the direction projecting from the tapered bore portion, with the extended portion inserted into a bore portion formed in the jig body.

Accordingly, the tapered shaft member is easily supported onto the bolt member and the cancel of the engaged condition of the bolt member to the bole hole for mounting the cylinder head can be automatically performed, by the control of the construction so as to exert the suppress strength on the tapered shaft member (such as the hydraulic control).

In the jig for processing the cylinder block according to the present invention, the threaded portion intensively engages the portion on the bottom portion side of the bolt hole of the female threaded portion.

Accordingly, the portion practically used for fastening the cylinder block on the female threaded portion can be prevented from receiving damages, so as to add the deformation external force to cause the cylinder bore to deform in the finish processing for the cylinder bore.

In a method for processing a cylinder block of the present invention, the method, which is used in a finish processing for a cylinder bore in the cylinder block, comprises a bolt portion, which is constructed so that it can be inserted into a bolt hole for mounting the cylinder head opening on the cylinder head mounting surface, and which is constructed so that it can be expanded in diameter thereof by a pressing action from the end side thereof, having a male threaded portion engageable to a female threaded portion of the bolt hole, as well as a pressing portion, which has a pressing surface that can contact a given surface portion of the cylinder head mounting surface, the pressing surface constructed so that it can be biased by a prescribed suppress strength in the same direction as a projecting one from the guide body of the bolt portion, in a guide body provided so as to relatively come close to and remove from the cylinder head mounting surface of the cylinder block, leading a tool for the finish processing, in a guide body provided so as to relatively come close to and remove from the cylinder head mounting surface of the cylinder block, leading a tool for the finish processing. The finish processing is performed, on the condition that the male threaded portion is engaged to the female threaded portion, by bringing the guide body close to cylinder head mounting surface and by engaging the end side of the bolt portion to the bottom of the bolt hole, with the bolt portion inserted into the bolt hole, so as to add the pressing action to the bolt portion and to expand the diameter of the bolt portion, and that the prescribed surface portion is pressed by biasing the pressing surface due to the given suppress strength in the direction, with the pressing surface contacting the prescribed surface portion, in the pressing portion.

Accordingly, in the finish processing for the cylinder bore in the cylinder block, existing equipments can be used, so as to preliminarily add the prescribed deformation to the cylinder bore, thereby improving the production efficiency, without the increase in the space, the equipment, the process or the like leading to the increase of the production cost.

The method for processing the cylinder block of the present invention intensively engages the male threaded portion to the portion on the bottom side of the bolt hole of the female threaded portion.

Accordingly, the portion practically used for fastening the cylinder block on the female threaded portion can be prevented from receiving damages, so as to add the deformation external force to cause the cylinder bore to deform in the finish processing for the cylinder bore. In other words, the functions required for the bolt hole for mounting the cylinder head can be avoided from impairing, by engaging the male threaded portion to the portion on the bottom side of the female threaded portion, thereby causing the given deformation to the cylinder bore.

DETAILED DESCRIPTION OF THE INVENTION

Figure 1:
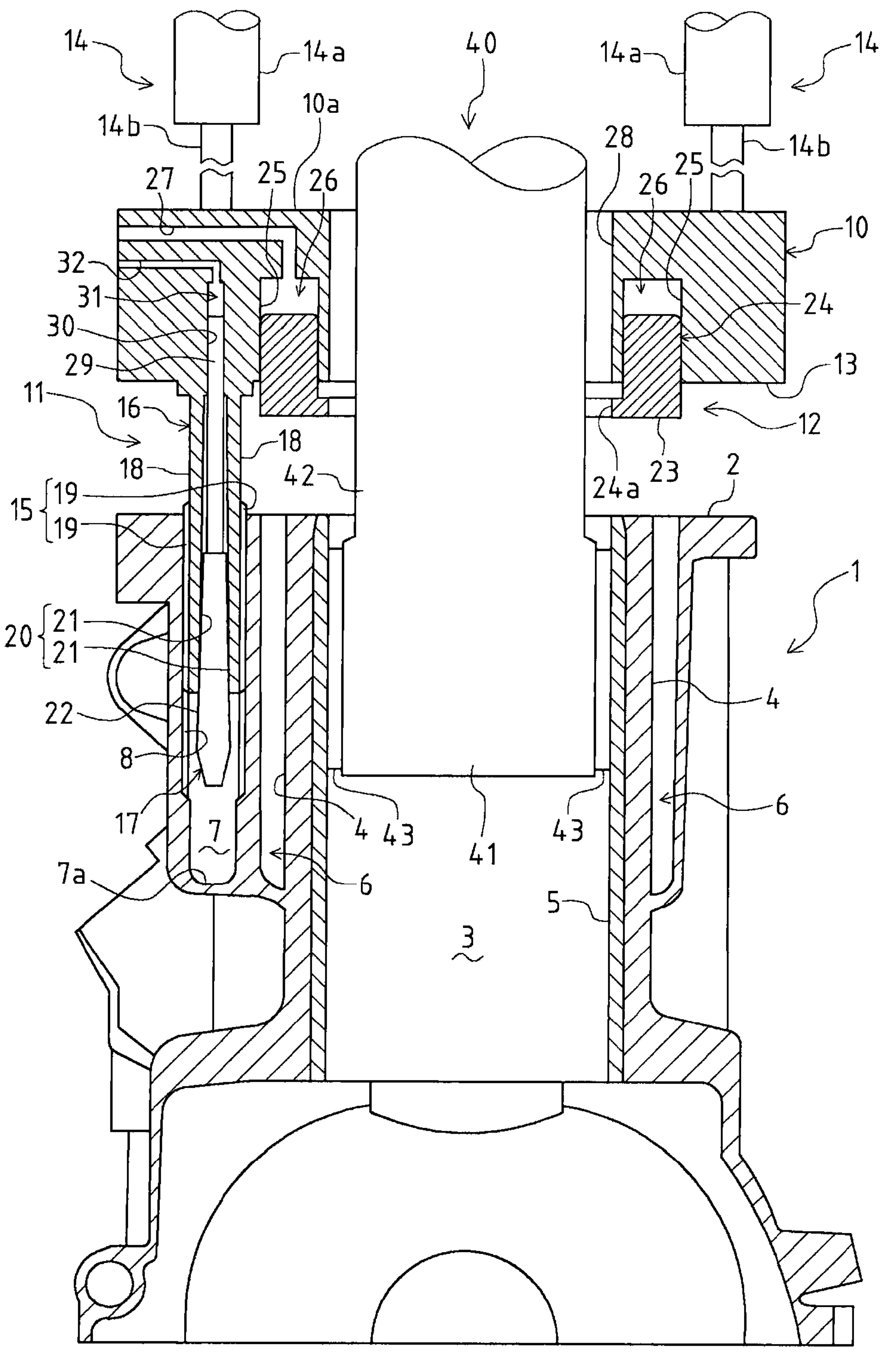
FIG. 1 is a cross-sectional diagram showing a jig for processing a cylinder block and the construction of the cylinder block according to an embodiment of the present invention.

The processing for the cylinder block according to the present invention is performed for the cylinder bore in the cylinder block, and a finish processing for acquiring the predetermined roundness in the cylinder bore. The cylinder bore is on the preliminary deformed condition, by adding the cylinder bore to the predetermined deformation, during the finish processing for the cylinder bore.

In other words, the cylinder bore slidably incorporates a piston connected to a crankshaft of an engine via a con rod. Thus, the prescribed roundness for the cylinder bore is required at the time of actual working of the engine, in view of the reduction of friction in the cylinder bore leading to the cause of adverse effects at the time of actual working of the engine.

Meanwhile, the cylinder bore deforms, by the effects such as the assembly of the components such as the cylinder head into the cylinder block, the heat deformation of the cylinder block at the time of actual working of the engine or the like. The forgoing deformation of the cylinder bore (the bore deformation) is related to the arrangement of a fastening portion of the cylinder head provided on the periphery of the cylinder bore in the cylinder block. Specifically, the deformation, on which a phase portion corresponding to the fastening portion of the cylinder head is relatively swelled inward, is caused in a circumferential shape as a shape in the central axis directional vision of the cylinder bore. The forgoing bore deformation leads to the deterioration of the roundness of the cylinder bore.

In this respect, the prescribed roundness of the cylinder bore is achieved, by performing the finish processing for it, on the condition that the bore deformation is preliminary reproduced, considering the bore deformation caused during the assembly of the components into the cylinder block or at the time of actual working of the engine. In other words, the portion swelled inward in the cylinder bore is preliminary cut more deeply than the other portions (for example, in the micrometer-size), by acquiring the predetermined roundness due to the finish processing, on the condition that the prescribed portion of it is swelled inward as mentioned before. Accordingly, the deterioration of the roundness of the cylinder bore at the time of actual working of the engine is reduced, thereby achieving the reduction of friction as described previously.

The construction of a cylinder block 1 as a processing object according to the present invention will be described, with reference to FIG. 1. Incidentally, in the following description, the vertical direction in FIG. 1 is defined as the vertical one in the cylinder block 1.

The cylinder block 1 according to the present embodiment comprises, for example, an automobile engine or the like, and is formed by subjecting casting (foundry piece) made of aluminum or the like to a predetermined machining process. The cylinder block 1 has a cylinder head mounting surface 2 for assembling the cylinder head (not shown) via a gasket or the like. The cylinder head mounting surface 2 is formed as a substantially horizontal surface on the upper side of the cylinder block 1. The cylinder block 1 is attached on the lower side thereof with an oil pan (not shown).

The cylinder block 1 has a cylinder bore 3. The cylinder bore 3 is a cylindrical aperture portion slidably incorporating a piston connected to a crankshaft of the engine via a con rod or the like (any of them is not shown). The cylinder bore 3 is open on the cylinder head mounting surface 2. The cylinder bore 3 is formed so that a cylindrical cylinder liner 5 is incorporated by a casting, press fitting or the like on the side of the inner peripheral surface of the cylinder portion 4 substantially cylindrically formed surrounding the cylinder bore 3 in the cylinder block 1. In other words, the inner peripheral surface of the cylinder liner 5 forms the cylinder bore 3 so as to be a sliding surface of the piston. Incidentally, in the present embodiment, the cylinder bore 3 is formed using the cylinder liner 5, but it may be directly formed in the structure of the cylinder block 1.

One or more cylinder bores 3 (only one is shown in FIG. 1) are provided in the cylinder block 1. For example, when the cylinder block 1 comprises the in-line four-cylinder engine, the four cylinder bores 3 are provided so that they are arranged in line to the depth direction in FIG. 1 (perpendicular to the page space).

A water jacket 6 is formed on the periphery of the cylinder bore 3 (on the outer peripheral side of the cylinder portion 4). The water jacket 6 is open on the cylinder head mounting surface 2. In other words, the water jacket 6 is open on the side of the cylinder head mounting surface 2 so as to make the cylinder block 1 of the present embodiment to be an open deck-typed structure.

The head bolt (not shown) as the fastening means is used, so as to fix the cylinder head in the cylinder block 1. For this reason, the bolt hole (hereinafter, referred to as "a head bolt hole") 7, into which the head bolt is screwed, is provided on the cylinder head mounting surface 2. The head bolt hole 7 is open on the cylinder head mounting surface 2. In other words, the cylinder head is firmly fixed onto the cylinder head mounting surface 2, by the head bolt, which penetrates a part of the cylinder head and is screwed into the head bolt hole 7. The head bolt hole 7 includes a female threaded portion 8 subjected to the screw cutting process.

In this regard, for convenience of diagramatic representation, one head bolt hole 7 is shown, but multiple head bolt holes 7 are provided at a predefined positions in accordance with the construction of the cylinder block 1 or the like. Specifically, when the cylinder block 1 makes up the in-line four-cylinder engine, for example, four head bolt holes 7 are provided at approximately equal spaces on the peripheries of the respective cylinder bores 3, and two head bolt holes 7 are shared between the adjacent cylinder bores 3, so that a total of ten head bolt holes 7 are provided thereon.

In the cylinder block 1 having the above construction, the finish processing (for example, the honing processing) so as to obtain the predetermined roundness of the cylinder bores 3 is performed.

As shown in FIG. 1, the construction including a tool 40 for the finish processing is utilized in the finish processing for the cylinder bore 3. The tool 40 has a head portion 41 and an axis portion 42 that supports the head portion 41. The head portion 41 is substantially cylindrically formed as a whole. The head portion 41 has whetstones 43. The whetstones 43 are formed so that the axial direction (the vertical direction) of the axis portion 42 becomes the longitudinal direction thereof, and multiple whetstones are provided, for example, at equal spaces in the circumferential direction on the outer peripheral surface portion of the head portion 41. The head portion 41 is supported on one end portion (lower end portion) of the axis portion 42. The axis portion 42 is provided in such a way that the axial direction thereof is the same as the axial direction of the substantially cylindrical shape of the head portion 41. The axis portion 42 is formed so that it can move in the axial direction and rotates around the axis thereof as a rotation axis, due to a drive means (not shown). In other words, the head portion 41 is provided so that it can move in the axial direction and rotate via the axis portion 42. In the finish processing for the cylinder bore 3, the grinding process by the whetstones 43 is performed on the wall surface forming the cylinder bore 3, due to the rotation movement of the head portion 41 or the like.

The jig for processing the cylinder block 1 (hereinafter, referred to as "the jig for processing") having the above-mentioned construction as a processing object is utilized, when the finish processing for the cylinder bore 3 is performed as describe above. Briefly, the after-mentioned jig for processing is utilized for burdening the cylinder block 1 with the external deformation force (the load) so as to add the cylinder bore 3 to the predefined deformation as described before.

As shown in FIG. 1, the jig for processing according to the present embodiment is constructed in such a way that the jig body 10 has a bolt portion 11 and a pressing portion 12.

The jig body 10, which has an opposed surface 13 facing with the cylinder head mounting surface 2, is formed so that the opposed surface 13 and the cylinder head mounting surface 2 are relatively close and disengaged, with the opposed surface 13 facing with the cylinder head mounting surface 2.

In the present embodiment, the jig body 10, as a whole, is composed of heavy-plate members, and the opposed surface 13 is formed of the plate at one side (the lower side) thereof. The opposed surface 13 has substantially the same size (area) as at least the cylinder head mounting surface 2. The jig body 10 is vertically movably supported by the cylinder assembly 14 connected to a supporting surface 10*a* formed of the plate on the opposite side (the upper side) of the opposed surface 13.

The jig body 10 is provided with one or more (two in FIG. 1) cylinder assemblies 14. For example, the cylinder assembly 14 is constructed as a hydraulic cylinder, an air cylinder or the like. The cylinder assembly 14 has a cylinder portion 14*a* and a rod portion 14*b*, at least part of which can be moved into and out of the cylinder portion 14*a*. The cylinder assembly 14 is provided so that the direction of the rod portion 14*b* moving into and out of the cylinder portion 14*a* corresponds to the direction (the vertical direction) of the opposed surface 13 coming close to and disengaging from the cylinder head mounting surface 2. The cylinder assembly 14 is connected to the jig body 10, by fixing the end of the rod portion 14*b* to the supporting surface 10*a* of the jig body 10. In other words, in the cylinder assembly 14, the jig body 10 moves to the direction coming close to and disengaging from the cylinder block 1 by the movement of the rod portion 14*b* moving into and out of the cylinder portion 14*a*. The opposed surface 13 comes close to and discharges from the cylinder head mounting surface 2, due to the movement of the jig body 10 by the cylinder assembly 14.

As seen from the above, in the present embodiment, the jig body 10 is movably supported by the cylinder assembly 14, so that the opposed surface 13 comes close to and discharges from the cylinder head mounting surface 2, with the opposed surface 13 facing with the cylinder head mounting surface 2.

The bolt portion 11 is provided so that it can be inserted into the head bolt hole 7, and it has a male threaded portion 15 engageable to the female threaded portion 8 of the head bolt hole 7, so that the diameter thereof can be expanded by the pressing action from the end thereof. Specifically, the bolt portion 11 is constructed as follows.

The bolt portion 11 includes a bolt member 16 projected from the jig body 10 and a tapered shaft member 17 provided so as to be inserted into the bolt member 16.

The bolt member 16 is saliently provided onto the opposed surface 13 as a portion having a rod-like outer shape that is capable of inserting into the head bolt hole 7.

Briefly, as shown in FIG. 1, the portion having the rod-like outer shape, which is provided so as to be suspended from the opposed surface 13 of the jig body 10, forms the bolt member 16. The bolt member 16 has a substantially cylindrical rod-like outer shape and has a diameter that is capable of inserting into the head bolt hole 7.

The bolt member 16 has a plurality of bolt pieces 18, having a threaded portion 19 engageable to the female threaded portion 8 of the head bolt hole 7 on the lateral surface thereof.

The bolt pieces 18 are formed by the potion of the bolt member 16, having the rod-like outer shape, divided while the dividing surface is parallel to the axial direction of the bolt member 16. Thus, the bolt member 16 is divided into several pieces by forming slits in the axial direction thereof or the like, whereby the bolt pieces 18 are formed based on the division number. In other words, the bolt member 16 having the rod-like outer shape is composed of multiple bolt pieces 18. In this regard, the division number of the bolt member 16, i.e., the number of the bolt pieces 18 in the bolt member 16 is not especially limited.

The respective bolt pieces 18 are formed on the lateral surfaces thereof with threaded portions 19 engageable to the female threaded portion 8 of the head bolt hole 7. The threaded portions 19 in the bolt pieces 18 comprise the male threaded portions 15 in the bolt portion 11.

The bolt member 16 forms a tapered bore portion 20 that is tapered on the side of the opposed surface 13 and is open on the opposite side of the opposed surface 13, by the internal surfaces 21 of the multiple bolt pieces 18. Thus, the bolt member 16 having the rod-like outer shape is substantially cylindrically constructed so as to have the bore portion in the axial portion thereof, which is constituted as the tapered bore portion 20 formed by internal surfaces 21 of the multiple bolt pieces 18. In other words, the respective bolt pieces 18, which is formed by the division of the substantially cylindrical bolt member 16 into several pieces as mentioned before, form approximately strip-shape portions defined the axial direction of the bolt member 16 as the longitudinal direction, and the internal surfaces 21 of the respective bolt pieces 18 forms the tapered bore portion 20.

The tapered bore portion 20 is tapered (is shrunk in diameter) on the side of the opposed surface 13, by having a part of spindly substantially conic shape defining the side of the opposed surface 13 (the upper side) as the top side. Consequently, the internal surfaces 21 of the respective bolt pieces 18 are gently sloped on the upper side thereof toward the shaft center portion of the bolt member 16, so as to be a curved surface forming a partial shape of the spindly substantially conic surface. The tapered bore portion 20 is open on the apical end side (the lower end side) of the bolt member 16. Briefly, the respective bolt pieces 18 making up the bolt member 16 are integrally connected on the basal portion side (the upper side) of the bolt member 16, so that the portions from the connected portion thereof to the apical end side (the lower end side) of the bolt member 16 are separated from the other bolt pieces 18.

Incidentally, in the present embodiment, the tapered bore portion 20 is formed so as to be tapered on the side of the opposed surface 13 by having a partial shape of the substantially conic shape, but is not limited to this construction. The shapes so that the tapered bore portion 20 is tapered on the side of the opposed surface 13 may include, for example, a partial shape of a multangular cone shape such as a trigonal pyramid or a square pyramid or the like. In this case, the internal surfaces 21 of the bolt pieces 18 are formed not by the curved surface forming a part of the substantially conic surface as the present embodiment, but by the plane surface portion.

The bolt member 16 expands in diameter thereof by displacing the multiple bolt pieces 18 due to the wedge action received via the tapered bore portion 20.

Specifically, the multiple bolt pieces 18 making up the bolt member 16 are radially-outwardly elastically deformed in the bolt member 16, from the portions on the basis point side integrally connected as described above, thereby displacing to be radially extended. The bolt member 16 expands in diameter thereof, due to the outward displacements of the respective bolt pieces 18. The outward displacements of the respective bolt pieces 18 are caused by the wedge action on the bolt member 16 via the tapered bore portion 20. The wedge action on the bolt member 16 is exerted from the tapered shaft member 17 via the tapered bore portion 20.

In this regard, in the present embodiment, the displacements of the bolt pieces 18 so as to extend the diameter of the bolt member 16 are due to the elasticities of the bolt pieces 18 as stated previously, but they are not limited to the elasticities. For example, the bolt pieces 18 may be constructed to be replicated on the connected portion of the basal portion side thereof, or they may be constructed to be replicated using a plurality of members, so that the respective bolt pieces 18 may be constituted to be radially-outwardly displaced in the bolt member 16.

The bolt member 16 having the above-mentioned construction is formed integrally with the jig body 10. In fact, the respective bolt pieces 18 making up the bolt member 16 is formed to be projected from the opposed surface 13 of the jig body 10, thereby being formed integrally with the jig body 10. In this regard, the bolt member 16 may be constructed as a different body from the jig body 10, by being assembled to the jig body 10 as another component or the like.

The tapered shaft member 17 has a tapered surface portion 22, which is inserted into the tapered bore portion 20, so as to be projected from the tapered bore portion 20, and which causes the wedge action by the relative movement between the bolt member 16 in the insertion direction thereof.

The tapered shaft member 17 is totally a rod-like one, and has a radial portion that can be inserted into the tapered bore portion 20. The tapered surface portion 22 is tapered (shrunk in diameter) toward the insertion direction of the tapered shaft member 17 into the tapered bore portion 20. The tapered surface portion 22 is tapered and fixed into (sphenicly engaged into) the tapered bore portion 20 of the bolt member 16. In other words, the tapered shaft member 17 is inserted into the tapered bore portion 20, and the tapered surface portion 22 contacts the internal surfaces 21 of the bolt pieces 18 forming the tapered bore portion 20, whereby the tapered surface portion 22 is tapered and fixed into the tapered bore portion 20. Therefore, the shape of the tapered surface portion 22 corresponds to that of the tapered bore portion 20. Briefly, in the present embodiment, the portion where the tapered surface portion 22 is formed in the tapered shaft member 17 become the one having the partial shape of the spindly substantially conic shape, in accordance with the tapered bore portion 20 having the partial shape of the spindly substantially conic shape The tapered shaft member 17 is provided so that it is inserted into the tapered bore portion 20 and a part of it is projected from the tapered bore portion 20. In fact, the tapered shaft member 17, which is inserted from one end side thereof into the tapered bore portion 20, and which a part of the other end side thereof is projected from the tapered bore portion 20, is supported on the bolt member 16.

The tapered shaft member 17 has an extended portion 29 on the end side of the insertion direction to the tapered bore portion 20. The tapered shaft member 17 is provided so that it can be biased by the given suppress strength in the direction projecting from the tapered bore portion 20, with the extended portion 29 thereof inserted into the bore portion 30 formed in the jig body 10.

The extended portion 29 is extended from the end portion on the end side of the insertion direction of the portion forming the tapered surface portion 22 into the tapered bore portion 20, in the tapered shaft member 17. In the present embodiment, the extended portion 29 has a smaller diameter than that of the portion forming the tapered surface portion 22, and is formed as the rectilinear (approximately the same diameter) rod-like portion. The extended portion 29 is inserted into the bore portion 30 formed in the jig body 10. Consequently, the bore portion 30 is formed so as to be continued to the tapered bore portion 20 of the bolt member 16, so that the extended portion 29, which is extended in the tapered shaft member 17 inserted into the tapered bore portion 20, is inserted into the bore portion 30 formed in the jig body 10. In this way, the tapered shaft member 17 is supported on the bolt member 16, with the extended portion 29 inserted into the bore portion 30 on the jig body 10.

The tapered shaft member 17 is provided so that it is supported on the bolt member 16 and it can be biased by the given suppress strength in the direction projecting from the tapered bore portion 20. In other words, the tapered shaft member 17 including the extended portion 29, which is inserted into the tapered bore portion 20 and the bore portion 30, can be biased by the suppress strength in the direction projecting from the tapered bore portion 20 (in the downward direction).

The suppress strength by which the tapered shaft member 17 is biased is caused by the hydraulic pressure. Specifically, the extended portion 29 in the tapered shaft member 17 is vertically slidably provided onto the bore portion 30. A hydraulic chamber 31 is formed in the bore portion 30 so that the hydraulic pressure is exerted on the tapered shaft member 17 via the extended portion 29. The hydraulic chamber 31 is connected to the hydraulic source such as the hydraulic pump (not shown) via an oil passage 32 formed in the jig body 10. Due to the above construction, the hydraulic pressure is supplied from the hydraulic source via the oil passage 32 to the hydraulic chamber 31, whereby the tapered shaft member 17 receives the prescribed suppress strength via the extended portion 29. Accordingly, the tapered shaft member 17 is biased in the direction projecting from the tapered bore portion 20 (in the downward direction).

In this regard, the construction so as to exert the prescribed suppress strength on the tapered shaft member 17 is not limited to the case where the hydraulic pressure is utilized as described in the present embodiment. Other configuration example of exerting the prescribed suppress strength on the tapered shaft member 17 includes the configuration, in which other fluid pressure such as the air pressure is used instead of the hydraulic pressure. Also, another configuration example includes the configuration where the elastic member such as a spring is incorporated in the bore portion 30 as a pressing member and the elastic force of the elastic member is used as the suppress strength acting on the tapered shaft member 17. The prescribed suppress strength acting on the tapered shaft member 17 will hereinafter be described.

As can be seen, the bolt portion 11 inserted into the head bolt hole 7 of the cylinder block 1 is constructed so that the tapered shaft member 17 is inserted into (the tapered bore portion 20 of) the bolt member 16 projecting from the opposed surface 13 of the jig body 10. The tapered shaft member 17 is forced into (the tapered bore portion 20 of) the bolt member 16, thereby extending the diameter of bolt member 16. The diameter-expansion of the bolt member 16 results in that of the bolt portion 11.

More specifically, the tapered shaft member 17 is forced into the tapered bore portion 20, thereby causing the bolt member 16 to the wedge action, via the tapered bore portion 20 and the tapered surface portion 22 tapered toward and fitted into the tapered bore portion 20. The wedge action which the bolt member 16 receives turns to be the action that the bolt pieces 18 moves outward via the internal surface 21 forming the tapered bore portion 20, due to the relative movement of the tapered shaft member 17 in the insertion direction into the tapered bore portion 20 to the bolt member 16. In other words, the wedge action that the bolt member 16 receives turns to be the action that the bolt pieces 18 deform outward in the radial direction of the bolt member 16 and they displace to be extended radially. The expanding action of the bolt pieces 18 leads to the diameter-expansion of the bolt member 16, i.e., that of the bolt portion 11.

Thus, the bolt portion 11 receives the pressing action from the end side thereof, so that the tapered shaft member 17 is forced into the tapered bore portion 20 of the bolt member 16, thereby expanding the diameter of the bolt portion 11. According to the pressing action that the bolt portion 11 receives from the end side thereof by being inserted into the head bolt hole 7, the bolt portion 11 is forced into the head bolt hole 7, thereby resulting the pressing action that the end portion of the bolt portion 11 (that of the tapered shaft member 17) receives from the bottom 7*a* of the head bolt hole 7 (hereinafter, referred to as "the bolt hole bottom").

The pressing portion 12 has a pressing surface 23 which can contact the predetermined surface portion of the cylinder head mounting surface 2, and it is constructed so that pressing surface 23 can be biased by the given suppress strength in the same direction as the projecting direction of the bolt portion 11 from the jig body 10. Specifically, the pressing portion 12 is constructed as follows.

The pressing portion 12 includes a piston member 24 provided movable in the direction where the jig body 10 comes close to and disengages from the cylinder block 1 (in the vertical direction) in the jig body 10.

The piston member 24 is provided so that it can be biased by the given suppress strength in the direction where it projects from the opposed surface 13 of the jig body 10, and it has the pressing surface 23 contacting the predetermined surface portion of the cylinder head mounting surface 2.

In the present embodiment, the pressing surface 23 of the piston member 24 is formed so as to press the peripheral portion of the cylinder bore 3 in the cylinder head mounting surface 2 (hereinafter, referred to as "the bore peripheral portion"). In other words, the pressing surface 23 is approximately annularly formed so that it contacts the bore peripheral portion of the cylinder bore 3. Accordingly, the piston member 24 is constructed as the approximately cylindrical member. Briefly, the pressing surface 23 is formed on the side of one end surface of the approximately cylindrical piston member 24.

In this regard, the shape of the pressing surface 23 and the piston member 24 forming the pressing surface 23 is suitably designed in accordance with the configuration such as the number of the cylinder bores 3 in the cylinder block 1 (the number of the cylinder engines). Specifically, for example, when the cylinder block 1 makes up the in-line four-cylinder engine, four cylinder bores 3 are arranged in line as described above. In the above-mentioned four cylinder bores 3, each of the pressing surfaces 23 provided corresponding to the adjacent cylinder bores 3 may be formed so that the annularly-shaped adjacent portions thereof are mutually continued (connected). Briefly, in this case, the shape of the pressing surfaces 23 is integrally formed so that the four annularly-shaped portions thereof are connected to each other at the adjacent portions so as to become continued in line. Likewise, the piston member 24 may be integrally formed so that the four annularly-shaped portions thereof are connected to each other at the adjacent portions so as to become continued in line. In this regard, even when the cylinder block 1 has a plurality of cylinder bores 3 (the engine is the multi-cylinder type), the pressing surfaces 23 and the piston members 24 corresponding to the respective cylinder bores 3 may be independently (separately) provided.

Also, the shape of the pressing surface 23 should only have the shape contacting the given surface portion of the cylinder head mounting surface 2, and is not limited to the one contacting the bore peripheral portion as the present embodiment. Briefly, "the given surface portion" of the cylinder head mounting surface 2 contacting the pressing surface 23 is the portion pressed by adding the deformation to the cylinder bore 3 in the cylinder head mounting surface 2. In other words, "the given surface portion" of the cylinder head mounting surface 2 is the portion corresponding to the deformation added to the cylinder bore 3. Further, the deformation added to the cylinder bore 3 is adjusted by adjusting the shape and size of the given surface portion of the cylinder head mounting surface 2. Therefore, the shape of the pressing surface 23 is suitably designed in accordance with the configuration of the cylinder block 1 or the like as mentioned above. The shape of the pressing surface 23 may be, for example, that of partially contacting the bore peripheral portion, or that of contacting the different portion from the bore peripheral portion of the cylinder head mounting surface 2.

The piston member 24 is provided so that at least a part thereof is moved into and out a cylinder recessed portion 25 formed so as to be open to the opposed surface 13 of the jig body 10. In other words, the piston member 24 is provided so that one end thereof is inserted into the cylinder recessed portion 25, and is movably supported by it in the insertion and opposite direction. Accordingly, the piston member 24 is provided movable to the jig body 10 in the direction where the jig body 10 comes close to and disengages from the cylinder block 1 (in the vertical direction). Incidentally, in the jig body 10, the piston member 24 is provided so as to be positioned so that the pressing surface 23 contacts the bore peripheral portion, with the bolt portion 11 inserted into the head bolt hole 7.

The cylinder recessed portion 25 supporting the piston member 24 has a corresponding shape to that of the piston member 24. Thus, in the present embodiment, the cylinder recessed portion 25 is formed as a substantially cylindrical recessed portion (a bore portion), in accordance with the substantially cylindrical piston member 24. Also, as stated above, when the cylinder block 1 makes up the in-line four-cylinder engine or the like, and when a plurality of piston members 24 are integrally formed so that they are continued in line, the cylinder recessed portion 25 is formed, in response to the shape of the piston members 24 (so that the piston members 24 can be inserted therein). Briefly, in this case, the cylinder recessed portion 25 is formed so that a plurality of substantially cylindrical recessed portion (the bore portion) are continued in line.

The piston members 24 is provided so as to be biased by the given suppress strength in the direction projecting from the opposed surface 13, in the condition that it is supported by the cylinder recessed portion 25 in the jig body 10. Briefly, the piston members 24, which is inserted into the cylinder recessed portion 25, can be biased by the predetermined suppress strength in the direction projecting from the opposed surface 13 (in the downward direction).

The suppress strength by which the piston members 24 is biased is caused by the hydraulic pressure. In other words, the piston members 24 is slidably provided in the direction moving in and out the cylinder recessed portion 25 (in the vertical direction). A hydraulic chamber 26 is formed in the cylinder recessed portion 25 so as to exert the hydraulic pressure on the piston member 24. The hydraulic chamber 26 is connected to the hydraulic source such as the hydraulic pump (not shown) via the oil passage 27 formed in the jig body 10. Due to the above construction, the hydraulic pressure is supplied from the hydraulic source via the oil passage 27 to the hydraulic chamber 26, whereby the piston member 24 receives the given suppress strength. Accordingly, the piston member 24 is biased in the direction projecting from the opposed surface 13 (in the downward direction).

In the condition that the pressing surface 23 of the piston member 24 contacts the bore peripheral portion, the piston member 24 is biased by the given suppress strength, so as to press the bore peripheral portion. Therefore, "the given suppress strength" exerting on the piston member 24 is configured depending on the deformation added to the cylinder bore 3.

Specifically, the scale of the deformation added to the cylinder bore 3 or the like are changed, due to the change of the suppress strength exerting on the bore peripheral portion. The strength by which the bore peripheral portion is pressed corresponds to the given suppress strength acting on the piston member 24. Therefore, the given suppress strength acting on the piston member 24 is suitably configured in accordance with the deformation added to the cylinder bore 3, and the given suppress strength is adjusted, so that the deformation added to the cylinder bore 3 is adjusted.

Incidentally, the construction so as to exert the given suppress strength on the piston member 24 is not limited to the case in which the hydraulic pressure is utilized as the present embodiment. Other configuration example of exerting the given suppress strength on the piston member 24 includes the case where other fluid pressures such the air pressure are used instead of the hydraulic pressure. Likewise, another configuration example includes the case where the elastic members such as the spring is incorporated into the cylinder recessed portion 25 as the pressing member, and the elastic forces of the elastic members is utilized as the suppress strength acting on the piston member 24.

As mentioned above, the pressing portion 12 pressing the predetermined surface portion of the cylinder head mounting surface 2 is constructed so that the piston member 24 having the pressing surface 23 can be biased by the given suppress strength and is movably supported onto the cylinder recessed portion 25 formed in the jig body 10. Accordingly, in the pressing portion 12, the pressing surface 23 can be biased by the given suppress strength in the same direction as the projecting direction of the bolt portion 11 from the jig body 10 (in the downward direction).

The jig body 10 making up the jig for processing according to the present embodiment is provide in such a way that it relatively comes close to and disengages from the cylinder head mounting surface 2, and functions as a guide body leading the tool 40 for used in the finish processing for the cylinder bore 3.

Briefly, as mentioned above, in the finish processing for the cylinder bore 3, the configuration, which is provided with the tool 40 having the head portion 41 and the axis portion 42, is utilized. The guide body leading the tool 40 is used in case of the rotational movement or the like of the head portion 41 in the tool 40. Briefly, the guide body is used so as to position the head portion 41 of the tool 40 with respect to the cylinder bore 3 or the like. In this respect, the jig body 10 is used as the guide body leading the tool 40, in the finish processing for the cylinder bore 3.

The jig body 10 has a guide hole 28, which will be a through-hole allowing the movement of the head portion 41 including the axis portion 42 in the axial direction thereof, as the construction to be used as the guide body for the tool 40. The jig body 10 guides the tool 40 (the head portion 41) moving via the guide hole 28. The wall surface forming the cylinder bore3 receives the grinding process by the grinding stone 43, due to the rotational movement or the like of the head portion 41 in the tool 40 guided by the jig body 10 as the guide body located in position with respect to the cylinder bore 3.

In this regard, in case of guiding the tool 40 via the guide hole 28 by the jig body 10, the tool 40 penetrates the inner peripheral side of the approximately cylindrical piston member 24 forming the pressing surface 23 contacting the bore peripheral portion. Briefly, the head portion 41 of the tool 40 is inserted into the cylinder bore 3, via the inner peripheral sides of the guide hole 28 and the piston member 24 in the jig body 10. In other words, a hole portion, allowing the movement of the head portion 41 including the axis portion 42 or the like in the axial direction thereof, is formed, together with the guide hole 28 of the jig body 10, in the piston member 24. In the present embodiment, the hole portion is formed by the inner peripheral surface 24*a* of the piston member 24 which is substantially cylindrically constructed.

Thus, the piston member 24 is provided so as not to interfere with the tool 40 guided by the guide hole 28 formed in the jig body 10. In other words, the cylinder recessed portion 25 supporting the piston member 24 and the guide hole 28 leading the tool 40 are provided so as not to interfere with each other, in the jig body 10.

In the jig for processing having the above-mentioned construction according to the present embodiment, the jig body 10 is movably provided, so that the opposed surface 13 in the jig body 10 comes close to and disengages from the cylinder head mounting surface 2 in the cylinder block 1, but the jig for processing is not limited to the above construction. That is to say, the jig body 10 as the guide body may be constructed so as to relatively come close to and disengage from the cylinder head mounting surface 2. Therefore, for example, the cylinder block 1 may come close to and disengage from the jig body 10, with the cylinder block 1 disposed on the lifting table or the like.

As described above, in the jig for processing according to the present embodiment, the jig body 10 is used as the guide body leading the tool 40 for the finish processing for the cylinder bore 3. In other words, conventionally, the guide body used in the finish processing for the cylinder bore 3 is utilized as the jig body 10 composing the jig for processing according to the present embodiment.

Specifically, in the processing method for the cylinder block according to the present embodiment, the guide body (the jig body 10), which is provided so as to relatively come close to and disengage from the cylinder head mounting surface 2, and which leads the tool 40 for used in the finish processing for the cylinder bore 3, is provided with the above-mentioned bolt portion 11 and the pressing portion 12. In the finish processing for the cylinder bore 3, by the bolt portion 11 and the pressing portion 12, the deforming external force is applied to the cylinder block 1 so as to add the prescribed deformation to the cylinder bore 3. The following actions can be achieved on the respective portion 11 and pressing portion 12, due to the addition of the deforming external force.

In the blot portion 11, the jig body 10 as the guide body comes close to the cylinder head mounting surface 2, with the blot portion 11 inserted into the head bolt hole 7. Accordingly, the end side of the bolt portion 11 engages the bolt hole bottom 7*a*, whereby the pressing action is added to the bolt portion 11 so as to expand the diameter of the bolt portion 11. The male threaded portion 15 becomes engaged to the female threaded portion 8 of the head bolt hole 7, due to the diameter expansion of the bolt portion 11.

Meanwhile, in the pressing portion 12, the pressing surface 23, which contacts the prescribed surface portion of the cylinder head mounting surface 2 (the bore peripheral portion), is biased by the given suppress strength of the pressing portion 12 in the projecting direction of the bolt portion 11 with respect to the jig body 10 (in the downward direction), whereby the bore peripheral portion becomes pressed.

In this way, the male threaded portion 15 of the bolt portion 11 engages the female threaded portion 8 of the head bolt hole 7, and the bore peripheral portion is pressed by the piston member 24, so that the finish processing for the cylinder bore 3 is performed. Hereinafter, the addition of the deforming external force to the cylinder block 1 by the jig for processing or the like, in the processing method for the cylinder block according to the present embodiment, will be concretely described with reference to FIG. 2.

Figure 2:
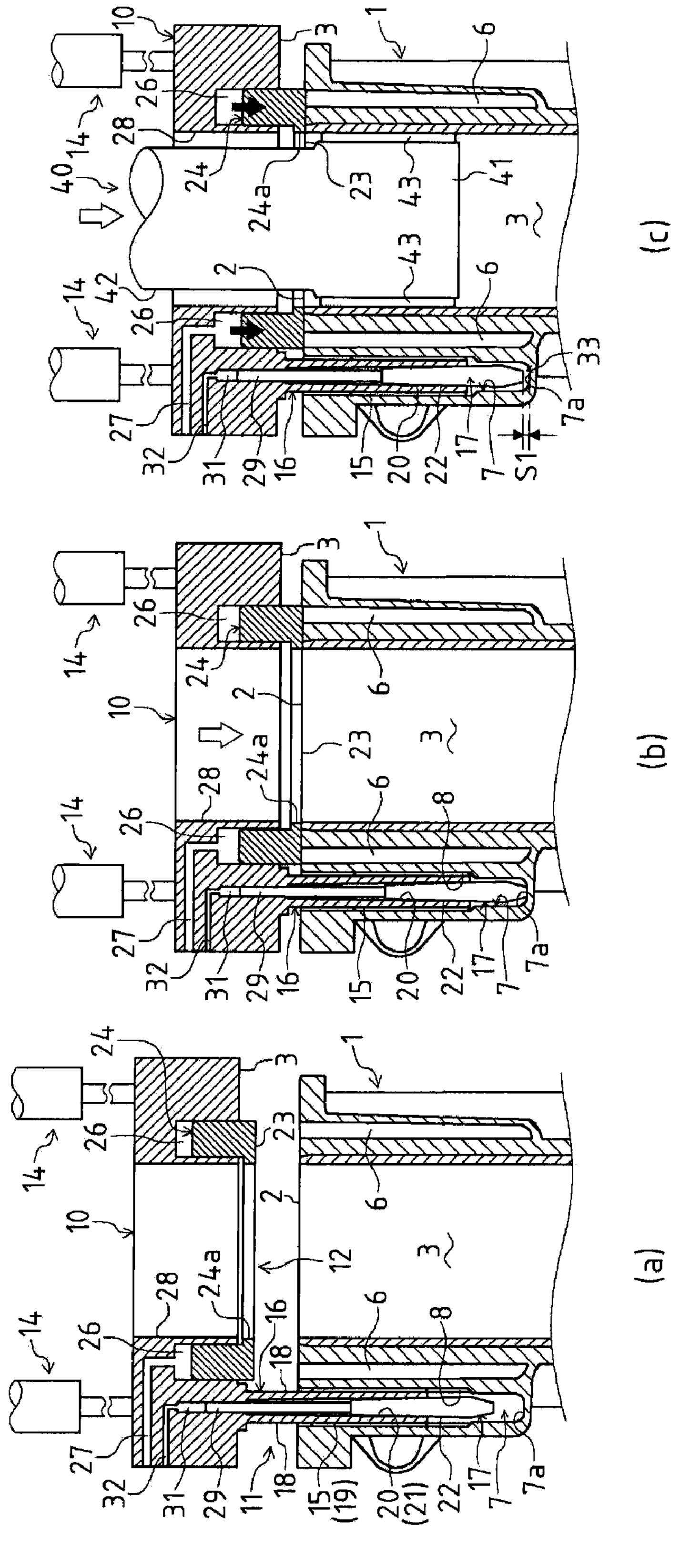
FIG. 2 is an illustration diagram of a finish processing for a cylinder bore using the jig for processing the cylinder block according to an embodiment of the present invention.

As shown in FIG. 2 (*a*), in case of the addition of the deforming external force to the cylinder block 1 by the jig for processing, first, the bolt portion 11 becomes inserted into the head bolt hole 7 of the cylinder block 1. In this regard, in the bolt portion 11, the tapered shaft member 17 becomes held onto the bolt member 16, at the position where the outer diameter of the bolt portion 11 (the diameter of the bolt member 16) reaches the size that is capable of being inserted into the head bolt hole 7. The jig body 10 is provided so that it can come close to and disengage from the cylinder head mounting surface 2, by the cylinder assembly 14, in the moving range to the extent that at least the bolt portion 11 can be inserted into and removed from the head bolt hole 7.

As mentioned before, when the bolt portion 11 is inserted into the head bolt hole 7, the pressing surface 23 of the piston member 24 is in the condition corresponding to (facing with) the prescribed surface portion of the cylinder head mounting surface 2, i.e., the bore peripheral portion in the present embodiment.

As shown in FIG. 2 (*b*), in the condition that the bolt portion 11 is inserted into the head bolt hole 7, the jig body 10 moves to the direction coming close to the cylinder head mounting surface 2 (comes down). The jig body 10 comes close to the cylinder head mounting surface 2, so that the end side of the bolt portion 11 engages the bolt hole bottom 7*a*. Briefly, the end of the tapered shaft member 17 projected from the bolt member 16 in the bolt portion 11 engages the bolt hole bottom 7*a*.

As mentioned before, in the condition that the end of the tapered shaft member 17 engages the bolt hole bottom 7*a*, the jig body 10 further moves to the direction coming close to the cylinder head mounting surface 2. Accordingly, the bolt member 11 receives the pressing action on the end side thereof from the bolt hole bottom 7*a*. In other words, the tapered shaft member 17 becomes pressed from the end side thereof by the bolt hole bottom 7*a*, and is forced into the tapered bore 20. Incidentally, the cylinder assembly 14 is used to move the jig body 10 in this case.

The tapered shaft member 17 is forced into the tapered bore 20, whereby the tapered surface portion 22 of the tapered shaft member 17 is tapered and fitted into the tapered bore 20 (contacts the internal surface 21 of the bolt pieces 18, and the wedge action exerts on the bolt member 16. Briefly, a plurality of bolt pieces 18 making up the bolt member 16 deform outwardly in the radial direction of the bolt member 16 and are displaced so as to extend radially, thereby expanding the diameter of the bolt member 16.

In this way, due to the diameter expansion of the bolt member 16, the male threaded portion 15 of the bolt portion 11 (the threaded portion 19 formed on the outer surface of the bolt pieces 18) becomes engaged to the female threaded portion 8 of the head bolt hole 7. In other words, the bolt member 16 has the same outer shape as a normal head bolt used for the head bolt hole 7 (the shape along the outer shape of the head bolt), and becomes engaged to the female threaded portion 8 of the head bolt hole 7.

As described above, while the bolt portion 11 becomes engaged to the female threaded portion 8 of the head bolt hole 7 via the male threaded portion 15 (hereinafter, referred to as "engaged condition"), the bore peripheral portion is pressed by the given suppress strength of the pressing surface 23, in the pressing portion 12. Specifically, as shown in FIG. 2(*c*), the hydraulic pressure is supplied from the hydraulic source via the oil passage 27 to the hydraulic chamber 26, so that the piston member 24 with the pressing surface 23 contacting the bore peripheral portion is biased by the given suppress strength in the direction projecting from the opposed surface 13 (in the downward direction) (See black arrows in FIG. 2 (*c*).). Accordingly, the bore peripheral portion of the cylinder block 1 becomes pressed by the given suppress strength.

As seen from the above, the engaged condition of the bolt portion 11 and the pressed condition of the bore peripheral portion due to the given suppress strength by the piston member 24 in the pressing portion 12 results in the condition that the deforming external force (the load) for adding the prescribed deformation to the cylinder bore 3 is exerted (hereinafter, referred to as "the deforming external force adding condition"). The deforming external force adding condition of the cylinder block 1 eventually becomes the same condition that a conventional dummy head is assembled in the cylinder block 1.

Specifically, conventionally, the dummy head is assembled into the cylinder block 1 using the head bolt forced into the head bolt hole 7. When the dummy head is assembled into the cylinder block 1, the prescribe surface portion of the cylinder head mounting surface 2 is pressed by fastening the head bolt, and the fastening axial force (the tension force) exerts on the head bolt hole 7 by the head bolt forced into the head bolt hole 7.

Thus, in the deforming external force adding condition of the cylinder block 1 by the jig for processing according to the present embodiment, the piston member 24 is biased by the given suppress strength, so that the bore peripheral portion is pressed by the pressing surface 23. This corresponds to the case where the prescribe surface portion of the cylinder head mounting surface 2 is pressed by fastening the head bolt, when the dummy head is used.

Likewise, in the deforming external force adding condition of the cylinder block 1, the bolt portion 11 in the engaged condition is pulled in the direction removed from the head bolt hole 7 (in the upward direction), via the jig body 10, due to the counteraction caused when the bore peripheral portion is pressed by the pressing surface 23 of the piston member 24. Briefly, in this case, the movement of the jig body 10 is not limited by the cylinder assembly 14, the strength in the direction where the jig body 10 disengages from the cylinder head mounting surface 2 (in the upward direction) exerts on the jig body 10, due to the counteraction caused when the piston member 24 presses the bore peripheral portion. The bolt portion 11 in the engaged condition is pulled by the action that the jig body 10 receives. This corresponds to the case where the fastening axial force (the tension force) by the head bolt exerts on the head bolt hole 7, when the dummy head is used.

In the deforming external force adding condition of the cylinder block 1 corresponding to the condition that the conventional dummy head is assembled as described above, the finish processing for the cylinder bore 3 is performed.

Specifically, as shown in FIG. 2 (*c*), the tool 40 for used in the finish processing of the cylinder bore 3 is guided with the jig body 10 as the guide body, and the head portion 41 of the tool 40 acts on the cylinder bore 3. In other words, the head portion 41 of the tool 40 is inserted into the cylinder bore 3 via the inner peripheral sides of the guide hole 28 and the piston member 24 in the jig body 10, so that the wall surface forming the cylinder bore3 receives the grinding process by the grinding stone 43.

After the finish processing for the cylinder bore 3, the deforming external force adding condition of the cylinder block 1 is canceled.

In the cancel of the deforming external force adding condition of the cylinder block 1, the hydraulic pressure, which biases the piston member 24 pressing the bore peripheral portion by the given suppress strength, is released. Accordingly, the force by which the bolt portion 11 in the engaged condition is pulled via the jig body 10 is removed. The tapered shaft member 17 is biased by the given suppress strength in the direction which it projects from the tapered bore portion 20, so as to cancel the engaged condition of the bolt portion 11. The detail will be shown as follows.

Specifically, in the deforming external force adding condition of the cylinder block 1, as mentioned above, the bolt portion 11 in the engaged condition is pulled in the direction removed from the head bolt hole 7 (in the upward direction), via the jig body 10, due to the counteraction caused when the bore peripheral portion is pressed by the pressing portion 12. Accordingly, the tapered shaft member 17 remains slightly suspended from the bolt hole bottom 7*a*. In other words, as shown in FIG. 2 (*c*), a little bit space 33 is formed between the end of the tapered shaft member 17 and the bolt hole bottom 7*a* (See referential mark S1).

In this way, when the space 33 between the tapered shaft member 17 and the bolt hole bottom 7*a* is formed, the tapered shaft member 17 is biased by the given suppress strength in the direction projecting from the tapered bore portion 20. Briefly, the hydraulic pressure is supplied from the hydraulic source via the oil passage 32 to the hydraulic chamber 31, whereby the tapered shaft member 17 is biased by the given suppress strength in the direction projecting from the tapered bore portion 20 (in the downward direction). Accordingly, the tapered shaft member 17 is displaced with respect to the space 33 formed between the end side thereof and the bolt hole bottom 7*a*. The tapered fitting of the tapered shaft member 17 onto the tapered bore portion 20 via the tapered surface portion 22 is released, due to the displacement of the tapered shaft member 17. When the tapered fitting of the tapered shaft member 17 onto the tapered bore portion 20 is released, the bolt portion 11 (the bolt member 16), which is expanding in diameter thereof, due to the wedge action via the tapered bore portion 20 by the tapered shaft member 17, is shrunk in diameter thereof. Accordingly, the male threaded portion 15 of the bolt portion 11 (the threaded portion 19 of the bolt pieces 18) is disengaged from the female threaded portion 8 of the head bolt hole 7. In other words, the engagement condition of the bolt portion 11 is canceled.

Therefore, "the given suppress strength" acting on the tapered shaft member 17 becomes the strength of the extent that the tapered fitting of the tapered shaft member 17, which is tapered and fit into the tapered bore portion 20 via the tapered surface portion 22, is released. Briefly, in the cancel of the engagement condition of the bolt portion 11, the tapered shaft member 17 is biased by the suppress strength of the extent that the tapered fitting onto the tapered bore portion 20 is released.

After the deforming external force adding condition of the cylinder block 1 has been canceled, the bolt portion 11 is withdrew from the head bolt hole 7, due to the movement of the jig body 10 or the like.

As will be appreciated from the foregoing, the addition of the deforming external force to the cylinder block 1 by the jig for processing, the finish processing for the cylinder bore 3, and the cancel of the deforming external force adding condition in the cylinder block 1 are performed.

By applying the above-described jig and processing method for processing the cylinder block 1, in the finish processing for the cylinder bore 3 in the cylinder block 1, existing equipments are available, so as to preliminarily add the prescribed deformation to the cylinder bore 3, thereby improving the production efficiency, without the increase in the space, the equipment, the process or the like leading to the increase of the production cost.

Specifically, conventionally, when the dummy head is utilized in the preliminary addition of the prescribed deformation to the cylinder bore, the preparation for a considerable number of dummy heads and addition of the spaces for them, the additions of equipments (such as rotating mechanism) and process for assembly and removal of the dummy head or the like are required, thereby increasing the production cost. On the other hand, in the jig for processing according to the present invention, the guide body as the existing equipment (the honing equipment) so as to guide the tool 40 in the finish processing for the cylinder bore 3 as the present embodiment, can be used as the jig body 10 making up the jig for processing, thereby using the existing equipment. Consequently, in comparison with the conventional use of the dummy head, the additions of the space, the equipment, the process or the like are not required, thereby enhancing the production efficiency. In other words, the improvement scale in the existing equipments remain minimized, and the highly accurate bore deformation can be realized, as is the case with the use of the dummy head, thereby acquiring the roundness effect on the cylinder bore 3.

Incidentally, the realization of the highly accurate bore deformation can be achieved, by adjusting the prescribed surface portion of the cylinder head mounting surface 2 contacting the pressing surface 23, and the given suppress strength by which the piston member 24 (the pressing surface 23) is biased, as the suppress strength acting on the prescribed surface portion. Briefly, the highly accurate bore deformation at the time of actual working of the engine including the assembly of the cylinder head or the like is realized, by adjusting the prescribed surface portion and the given suppress strength.

In the jig for processing according to the present embodiment, the tapered shaft member 17 is provided so that it can be biased by the given suppress strength in the direction projecting from the tapered bore portion 20 via the extended portion 29, whereby the tapered shaft member 17 is easily supported onto the bolt member 16 and the cancel of the engaged condition of the bolt portion 11 can be automatically performed, by the control of the construction so as to exert the suppress strength on the tapered shaft member 17 (such as the hydraulic control) or the like.

Figure 3:
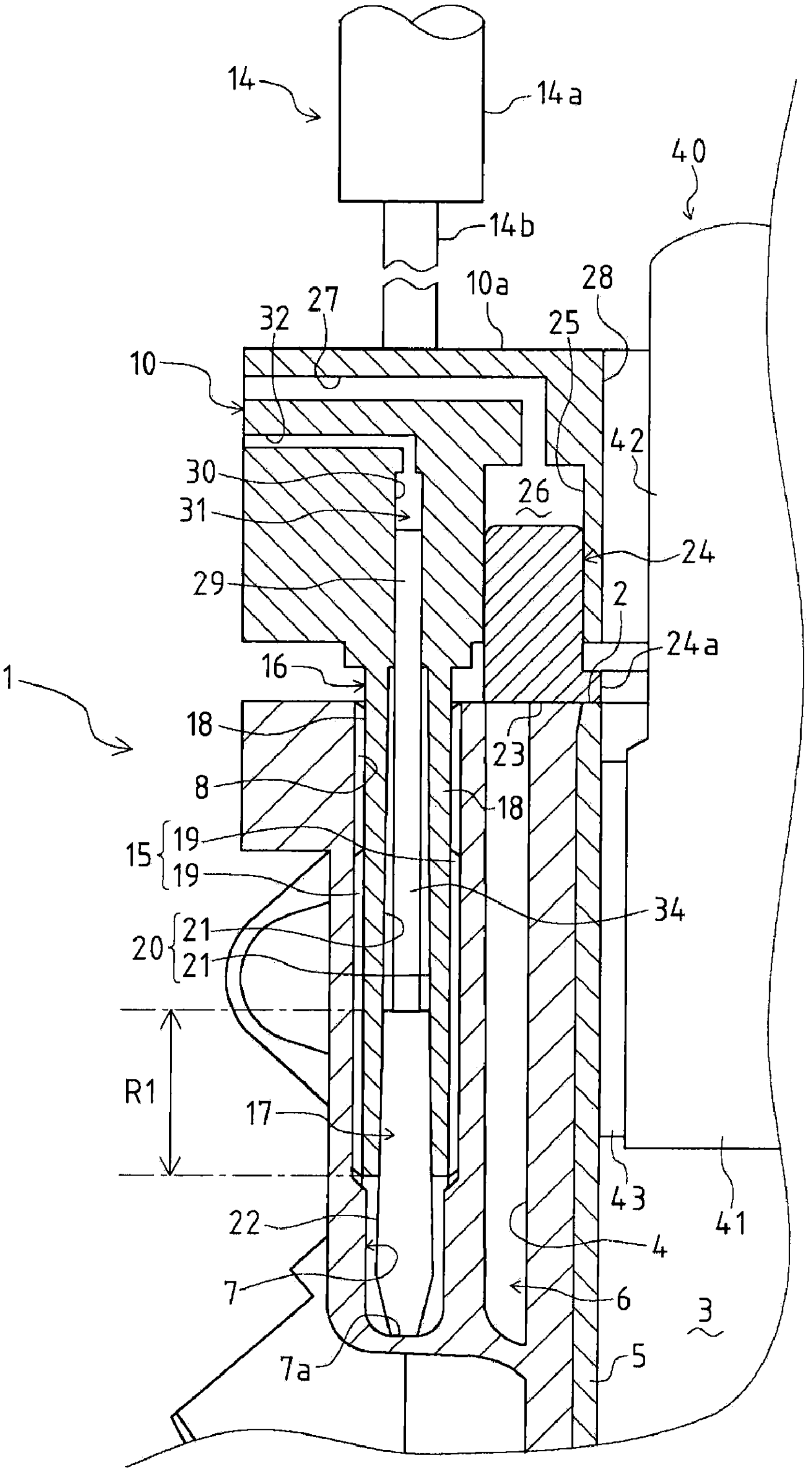
FIG. 3 is a partially enlarged sectional view showing the jig for processing the cylinder block and the construction of the cylinder block according to an embodiment of the present invention.

The engagement range of the male threaded portion 15 (the threaded portion 19 of the bolt pieces 18) to the female threaded portion 8 of the head bolt hole 7, in the bolt portion 11, will be described with reference to FIG. 3.

In general, in the fastening of the bolt (the male screw) onto the bolt hole (the female screw), the bolt hole receives a more pressure (a fastening strength) from the bolt, toward the base portion of the bolt. Therefore, for example, as the cylinder block 1 according to the present embodiment as shown in FIG. 1, in the construction having the head bolt hole 7 so as to fasten the head bolt engaging the female threaded portion 8, as the range of the female threaded portion 8 is expanded toward the base side of the head bolt (the open side of the head bolt hole 7, the upper side in FIG. 1), the fastening strength by the head bolt is dispersed. When the fastening strength by the head bolt is dispersed, the distortion (the deformation) of the cylinder block 1 leading to the bore deformation by fastening the head bolt onto the head bolt hole 7 becomes reduced.

This phenomenon is found in the construction that the head bolt hole 7 is formed on the outside of the water jacket 6 formed on the periphery of the cylinder bore 3, as the cylinder block 1 according to thee present embodiment. In other words, as the range of the female threaded portion 8 in the head bolt hole 7 is expanded toward the distal side of the bottom portion (the lower end portion) of the water jacket 6, the fastening strength by the head bolt is dispersed, whereby the bore deformation by the fastening of the head bolt becomes reduces.

This phenomenon is obtained as the finding, which sometimes is used so as to reduce the bore deformation caused during the assembly of the cylinder head into the cylinder block 1. Briefly, in this case, for example, in the designing of the cylinder block, the engagement position of head bolt to the head bolt hole is set up to be as far as possible from the bottom portion of the water jacket, so that the bore deformation during the assembly of the cylinder head into the cylinder block and at the time of actual working of the engine become reduced.

Meanwhile, when the above-mentioned phenomenon is viewed from the opposite side, in the cylinder block 1 having the construction that the bolt hole bottom 7*a* of the head bolt hole 7 is near the bottom portion of the water jacket 6, as the engagement position of the head bolt to the head bolt hole 7 comes close to the bottom portion of the water jacket 6, the bore deformation by the head bolt fastening becomes increased.

In this regard, in the jig for processing according to the present embodiment, it is preferable that the male threaded portion 15 of the bolt portion 11 (the threaded portion 19 of the bolt pieces 18) intensively engages the portion at the side of the bolt hole bottom 7*a* of the female threaded portion 8 on the head bolt hole 7.

Specifically, as mentioned above, making a reverse use of the phenomenon that as the range of the female threaded portion 8 in the head bolt hole 7 is expanded toward the base side of the head bolt, the bore deformation during the assembly of the cylinder head becomes reduced, the bolt portion 11 is engaged to only the portion at the side of the bolt hole bottom 7*a* of the female threaded portion 8.

In this respect, "the portion at the side of the bolt hole bottom 7*a* in the female threaded portion 8", as the portion to which the male threaded portion 15 of the bolt portion 11 intensively engages, is defined as, for example, the portion of the extent of half to one third from the lower side of the range where the female threaded portion 8 is formed on the head bolt hole 7 (the side of the bolt hole bottom 7*a*). In other words, the engagement range of the male threaded portion 15 to the female threaded portion 8 shown as the referential mark R1 in FIG. 3 is defined as, for example, the range of half to one third from the lower side of the range where the female threaded portion 8 is formed on the head bolt hole 7 (the side of the bolt hole bottom 7*a*).

The following construction is utilized, as the construction that the male threaded portion 15 of the bolt portion 11 intensively engages the portion at the side of the bolt hole bottom 7*a* of the female threaded portion 8 (hereinafter, referred to as "the bottom side portion").

Briefly, the tapered shapes (the tapered profile) of the tapered bore portion 20 of the bolt member 16 and the tapered surface portion 22 on the tapered shaft member 17 having the tapered fitting therewith, causing the wedge action so as to engage the male threaded portion 15 to the female threaded portion 8, are set up so that the male threaded portion 15 intensively engage the bottom side portion of the female threaded portion 8.

Specifically, the tapered shapes of the tapered bore portion 20 and the tapered surface portion 22 are set up so that the tapered degrees (the diameter shrinking degrees) thereof become relatively large.

Accordingly, the tapered shaft member 17 having the tapered fitting onto the tapered bore portion 20 via the tapered surface portion 22 is moved toward the direction inserted into the tapered bore portion 20 (is installed into the tapered bore portion 20) with respect to the bolt member 16, whereby the diameter expanding degree of the bolt portion 11 (of the bolt member 16) become larger and the pressure (the fastening strength) received from the male threaded portion 15 grows larger on the bottom side portion of the female threaded portion 8. As a result, the male threaded portion 15 intensively becomes engaged the bottom side portion of the female threaded portion 8.

The following tapered shaft member 17 is used for the common (for example, the same as the bolt member 16 shown in FIG. 1) bolt member 16, so that the male threaded portion 15 intensively becomes engaged the bottom side portion of the female threaded portion 8. Specifically, for example, as shown in FIG. 3, in the tapered shaft member 17 in this situation, the tapered surface portion 22 having the larger diameter (the tapered diameter), relative to the tapered bore portion 20, is formed on the potion of the end side (the lower side) of the tapered shaft member 17. In parallel, the portion of the more proximal side (the upper side) from the tapered surface portion 22 is formed as the portion having the smaller diameter (the small diameter portion 34), to the extent that it does not have the tapered fitting onto the tapered bore portion 20 (it does not contact the internal surface 21 of the bolt pieces 18).

When the above-mentioned tapered shaft member 17 is used, as stated previously, the tapered shaft member 17 having the tapered fitting is installed into the bolt member 16, whereby the diameter expanding degree of the bolt portion 11 (of the bolt member 16) become larger, so as to intensively engage the male threaded portion 15 to the bottom side portion of the female threaded portion 8.

Other configuration example so as to intensively engage the male threaded portion 15 to the bottom side portion of the female threaded portion 8 includes the configuration that the male threaded portion 15 (the threaded portion 19 of the bolt pieces 18) itself is formed only on the end side portion of the bolt member 11. Due to this configuration, the male threaded portion 15 engages only the bottom side portion of the female threaded portion 8 engaging the end side portion of the bolt member 11. The surface portion, which the male threaded portion 15 (the threaded portion 19) is not formed on the outer peripheral surface of the bolt portion 11 (the lateral surface of the bolt pieces 18), is engaged with pressure to the female threaded portion 8, due to the diameter expansion of the bolt portion 11.

Thus, the intensive engagement of the male threaded portion 15 to the bottom side portion of the female threaded portion 8 includes the engagement of the male threaded portion 15 only to the bottom side portion of the female threaded portion 8. The following actions can be achieved, by intensively engaging the male threaded portion 15 of the bolt portion 11 to the bottom side portion of the female threaded portion 8 of the head bolt hole 7, as described previously.

More specifically, when the bolt portion 11 in the engaged condition is pulled via the jig body 10, above a certain surface pressure is not added to the portion on the open side (the upper side) of the female threaded portion 8, by the runout from the tapered bore portion 20 due to the diameter shrinking of the portion on the base side of the tapered axis portion 17 or the like. Likewise, when the bolt portion 11 is pulled via the jig body 10, the distribution of the strength caused when the bolt portion 11 in the engaged condition is pulled is increased, on the bottom side portion of the female threaded portion 8. In other words, the strength corresponding to the fastening axial force (the tension force) of the head bolt, caused when the bolt portion 11 in the engaged condition is pulled, intensively exerts on the bottom side portion of the female threaded portion 8.

Accordingly, bases on the findings as described above, a small tension force by the bolt portion 11 adds a large distortion (deformation) to the cylinder block 1. Briefly, the force can efficiently cause the bore deformation. Consequently, the power of the equipment in the jig for processing the cylinder block 1 can be reduced, and accordingly, the miniaturization of the equipments and the cost reduction can be achieved.

In other words, the bore deformation at the time of actual working of the engine, having a larger scale of deformation than the bore deformation during the assembly of the cylinder head, can be easily realized, without the increase of the equipments or the like.

Specifically, in the jig for processing according to the present embodiment, for example, the power of the equipment can be reduced, with regard to the construction so as to cause the tension force (the thrust force) to the bolt portion 11 via the jig body 10, i.e., the construction (the hydraulic pressure construction) so as to add the given suppress strength to the piston member 24.

As mentioned above, in the fastening of the bolt (the male screw) onto the bolt hole (the female screw), the bolt hole receives the more pressure (the fastening strength) from the bolt, toward the base portion of the bolt. For this reason, the head bolt used when the actual cylinder head is assembled into the cylinder block 1 intensively exerts the fastening axial force on the head bolt hole 7, at the base portion thereof (at the portion at the open side of the head bolt hole7).

Accordingly, as mentioned before, when the deforming external force for the bore deformation in the finish processing for the cylinder bore 3 is added, by intensively engaging the male threaded portion 15 of the bolt portion 11 to the bottom side portion of the female threaded portion 8 of the head bolt hole 7, the portion used for fastening the actual cylinder head in the female threaded portion 8 is prevented from being damaged. Briefly, the male threaded portion 15 is intensively engaged to the bottom side portion of the female threaded portion 8, thereby preventing the functions needed for the head bolt hole 7 from being damaged and causing the prescribed bore deformation.

INDUSTRIAL APPLICABILITY

The jig for processing and the processing method for the cylinder block according to the present invention is industrially applicable in that it can use the existing equipments, in case of preliminarily adding the prescribed deformation to the cylinder bore, in the finish processing for the cylinder bore in the cylinder block, thereby improving the production efficiency, without the increase of the space, the equipment, the process or the like, leading to the increase in production cost.

The invention claimed is:

1. A jig for processing a cylinder block for used in finish processing for a cylinder bore in the cylinder block, comprising:

a jig body, which has an opposed surface facing a cylinder head mounting surface of the cylinder block and which is provided so that the opposed surface and the cylinder head mounting surface relatively come close to and disengage from each other, with the opposed surface facing the cylinder head mounting surface;

a bolt member, which is saliently provided onto the opposed surface as a portion having a rod-like outer shape that is capable of being inserted into a bolt hole for mounting the cylinder head opening on the cylinder head mounting surface, and which has multiple bolt pieces that are formed on the lateral surface thereof with a threaded portion engageable to a female threaded portion of the bolt hole, wherein it forms a tapered bore portion that is tapered on the opposed surface side and that is opened on the opposite side of the opposed surface side by the internal surfaces of the bolt pieces, so as to expand the diameter thereof by displacing the multiple bolt pieces due to a wedge action receiving through the tapered bore portion;

a tapered shaft member, which has a tapered surface portion that is inserted into and projected from the tapered bore portion and that provides the wedge action by the relative movement between the bolt member thereof in the insertion direction; and a piston member, which is provided so that it can be biased by a given suppress strength in the direction projecting toward the opposed surface, and which has a pressing surface contacting a prescribed surface portion of the cylinder head mounting surface.

2. The jig for processing the cylinder block as set forth in claim 1, wherein the tapered shaft member has an extended portion on the end side of the insertion direction into the tapered bore portion, and is provided so that it can be biased by the given suppress strength in the direction projecting from the tapered bore portion, with the extended portion inserted into a bore portion formed in the jig body.

3. The jig for processing the cylinder block as set forth in claim 1, wherein the threaded portion intensively engages the portion of the bottom portion side of the bolt hole of the female threaded portion.

4. A method for processing a cylinder block for used in a finish processing for a cylinder bore in the cylinder block, the method comprising:

providing a bolt portion and a pressing portion in a guide body so as to relatively come close to and remove from the cylinder head mounting surface of the cylinder block, leading a tool for the finish processing, the bolt portion constructed so as to be inserted into a bolt hole for mounting the cylinder head opening on the cylinder head mounting surface, and so as to be expanded in diameter thereof by a pressing action from the end side thereof, having a male threaded portion engageable to a female threaded portion of the bolt hole, and the pressing portion, having a pressing surface that can contact a given surface portion of the cylinder head mounting surface, the pressing surface constructed so as to be biased by a prescribed suppress strength in the same direction as a projecting one from the guide body of the bolt portion; and performing the finish processing, on the condition that the male threaded portion is engaged to the female threaded portion, by bringing the guide body close to cylinder head mounting surface and by engaging the end side of the bolt portion to the bottom of the bolt hole, with the bolt portion inserted into the bolt hole, so as to add the pressing action to the bolt portion and to expand the diameter of the bolt portion, and that the prescribed surface portion is pressed by biasing the pressing surface due to the given suppress strength in the direction, with the pressing surface contacting the prescribed surface portion, in the pressing portion.

5. The method for processing the cylinder block as set forth in claim 4, further comprising:

intensively engaging the male threaded portion to the portion on the bottom side of the bolt hole of the female threaded portion.

* * * * *